Patented Dec. 19, 1933

1,940,395

UNITED STATES PATENT OFFICE 1,940,395

PROCESS FOR BREAKING PETROLEUM EMULSIONS

Melvin De Groote, St. Louis, Mo., assignor to Tretolite Company, Webster Groves, Mo., a corporation of Missouri No Drawing. Application January 21, 1933
Serial No. 652,945

9 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottoms of oil storage tanks, and are commonly referred to as "cut oil", "roily oil", "emulsified oil" and "bottom settlings".

The object of my invention is to provide a novel, inexpensive and efficient process for separating emulsions of the kind referred to into their component parts of oil and water or brine.

Briefly described, my process consists in subjecting a petroleum emulsion of the water-in-oil type, to the action of a treating agent or demulsifying agent of a particular composition hereinafter described, thereby causing the emulsion to break down and separate into its component parts of oil and water or brine, when the emulsion is permitted to remain in a quiescent state after such treatment.

Various classes of materials have heretofore been used or suggested as demulsifying agents in the resolution of petroleum emulsions, such as water softeners, modified fatty acids, hydroxy aromatics, various non-fatty sulfonic acids, etc. Mixtures of materials of the kind above mentioned have also been used or suggested, sometimes with improved results and sometimes with inferior results. Generally, when various classes of materials are efficient demulsifiers, mixtures of such materials are also efficient demulsifiers, provided that the materials constituting a mixture are not incompatible, but the value or effectiveness of a mixture produced by combining a known demulsifier selected from one class with another known demulsifier selected from a different class, can easily be determined by simple routine chemical experimentation involving only chemical skill or knowledge, as distinguished from inventive ability. There have been instances where particular petroleum emulsions or particular types of emulsion would not respond to treatment with the individual members of a class or classes of demulsifiers, or with mixtures produced from selected members of two different classes of known demulsifiers, and when such emulsions are encountered, inventive ability is often required to produce a demulsifying agent that will successfully "break" or treat the emulsion under consideration. An example of a demulsifying agent of the kind last referred to is the one described in U. S. Patent No. 1,659,998, to Keiser, dated February 21, 1928, which demulsifying agent consists of a mixture of previously known demulsifiers, combined in certain specific proportions.

The treating agent or demulsifying agent contemplated by my process is of the kind that is composed of a mixture of materials, but it is also that particular type of mixture which is characterized by great specificity, both in the substances of which it is composed, and in the quantities or proportions of said substances. It consists of or comprises a naphthenic acid or salt of the kind hereinafter defined, mixed with a certain specific dialkyl polysulfonate. Any or all naphthenic acids or salts are not suitable, and any or all dialkyl polysulfonates or salts thereof are not suitable. On the contrary, only naphthenic acids of the particular kind herein described and defined are contemplated by my present invention. I have not found it suitable to employ high molecular weight naphthenic acids in a mixture, even though they are the equivalent of these naphthenic acids for many ordinary purposes. The naphthenic acids or salts intended to be used as one ingredient or substance of the demulsifying agent contemplated by my process, are the particular naphthenic acids described in the pending application for patent of De Groote et al, Serial No. 652,941, filed January 21, 1933. Accordingly, I have herein used the term "a naphthenic acid of the kind herein defined" to mean a naphthenic acid or a mixture of naphthenic acids, having a molecular weight not less than 200, and having a means molecular weight of approximately 225, and having a distillation range varying from approximately 230° C. to 310° C. A typical distillation range is shown in the following table:

| | |
|---|---|
| 10% | 230° C. |
| 20% | 255° C. |
| 30% | 268° C. |
| 40% | 273° C. |
| 50% | 278° C. |
| 60% | 279° C. |
| 70% | 287° C. |
| 80% | 290° C. |
| 85% | 292° C. |
| 100% | 310° C. |

These naphthenic acids should be soluble in 65% ethyl alcohol when 10% naphthenic acid is added, but they should be insoluble when only 5% is added. The selected naphthenic acids should show no substantial iodine number. When the iodine number determination is made by the Hübl-Waller method, they should not show an iodine number greater than 2 or 3. The saponification number should be in the neigihborhood of 250. The specific gravity at 77° C. should be about 0.9635. Naphthenic acids of the kind above described are commercially available, and in selecting the particular naphthenic acid that is to be used as one ingredient of the demulsifying agent, resonable variation from the above specification is permissible, but it should only be variation of the kind that one would expect in ordinary commercial products. If any marked deviation is made from the above described specification of the naphthenic acid employed, it will be found that the selected naphthenic acid is substantially worthless.

The dialkyl-polysulfonates intended to be used as the other ingredient of the mixture are of the kind described or referred to in U. S. Patent No. 1,747,119 to William B. Lerch, dated February 11, 1930. As stated by Lerch in said patent, these dialkyl-polysulfonates are characterized by the fact that they are obtained by sulfonation of highly unsaturated tars. Dialkyl polysulfonates can be obtained from other sources than those mentioned in said Lerch patent. For instance, due to the present low market value of crude rubber, this material may be used as a raw material and subjected to destructive distillation, so as to yield a product relatively high in diolefins. Said distillation product may be treated with sulfuric acid to yield dialkyl polysulfonates. Such materials, although similar in composition to the material disclosed by the Lerch patent, are not suitable for use as one ingredient of the demulsifying agent contemplated by my process. Therefore, in order to clearly define my invention, I have herein used the term "dialkyl polysulfonate salts obtained by sulfonation of highly unsaturated tars" to mean or refer to only dialkyl polysulfonates of the kind described in the above mentioned Lerch patent, and to no other dialkyl polysulfonates. Furthermore, the mixture constituting my improved demulsifying agent, is limited to dialkyl polysulfonates in the form of a water-soluble alkali salt. In other words, the dialkyl sulfonate body must be in the form of a water-soluble ammonium salt, potassium salt, sodium salt, etc. The ammonium radical is considered as an alkali along with the metals sodium and potassium. Ammonium hydroxide is just as satisfactory for neutralizing dialkyl sulfonic acids as the sodium or potassium hydroxide. In the manufacture of ammonium soaps for certain purposes, it has been found that improved products can sometimes be obtained by replacing the ammonia with certain hydroxy amines, such as triethanolamine, which act just the same as ammonia. It should be understood that these hydroxy amines which act like ammonia are considered the equivalent of the ammonium radical or the equivalent of an alkaline metal in my invention.

I make no broad claim to mixtures composed of naphthenic acids of the particular kind herein described and dialkyl polysulfonic acid or salts. On the contrary, my invention is limited to a process wherein the demulsifying agent that is employed contains not over 40% of water, and shows oil-solubility, as well as water-solubility. Mixtures of the kind contemplated by my invention must dissolve in kerosene and produce a 20% solution; that is, when 20 parts of the mixture is mixed with 80 parts of ordinary kerosene. Unless the mixture shows this oil-solubility, it does not appear to have any unusual effectiveness in treating petroleum emulsions. Naphthenic acids of the kind herein defined may be replaced in part by the sodium, potassium or ammonium salt, that is, the sodium, potassium or ammonium naphthenate derived from a naphthenic acid coming within the specification previously set forth. In addition to having the limiting characteristics previously set forth, the mixture contemplated by my process must also show water-miscibility. In other words, the mixture, in addition to showing 20% oil-solubility above described, must be capable of mixing with water to form a 5% solution or suspension of a relatively stable type.

The most feasible way of preparing a mixture of the kind previously described is to make a combination in which there is no more than three times as much of one type of reagent or material as the other. In other words, if three parts of dialkyl polysulfonate is used, one must mix therewith not less than one part of naphthenic acids of the kind herein defined, and not more than nine parts of such naphthenic acids. The actual amount of the naphthenic acid required depends on various factors, namely, the peculiar composition of the alkyl residues and also on the presence of inert material. It also depends on the amount of water present, and to some degree, on whether or not the water present contains a considerable amount of dissolved inorganic salts, such as sodium sulfate as an inherent impurity. Solubility is also affected by the base used for neutralization. Generally speaking, potassium or ammonium salts show greater oil-solubility than sodium salts. In any event, when the mixture of the dialkyl polysulfonates and naphthenic acids of the kind described is prepared, if oil-solubility is not sufficient, a small amount of a base, such as ammonia, should then be added to neutralize the naphthenic acids and thus increase oil-solubility. In the majority of cases, it is best that the mixture be made in a proportion of approximately one part of dialkyl ammonium sulfonate and one part of naphthenic acids of the kind described with subsequent neutralization, if required.

My preferred demulsifying agent is prepared in the following manner: A mixture of dialkyl polysulfonate ammonium salts are obtained by treating 100 parts of Blau gas tar with 50 parts of 66° Baumé sulfuric acid at approximately 40° C., until the reaction is completed. Approximately three parts of water are then added with constant stirring. The mixture is allowed to separate and the dilute sulfuric acid is withdrawn. The dialkyl polysulfonic acids thus obtained are reacted with strong ammonium hydroxide until neutral. The product thus obtained is mixed with an equal part of naphthenic acids of the kind herein described and should show oil-solubility when 20 parts of the mixture is shaken with 80 parts of kerosene. If said mixture does not possess such oil-solubility, strong ammonium hydroxide is cautiously added with constant stirring, and frequent tests are made to determine the appearance of such desired oil-solubility. Sometimes, when such desired oil-solubility is obtained, it may be desirable to continue to add some more of the neutralizing agent, such as ammonia or caustic soda, or caustic potash, or triethanolamine as the case may be, but in no event should the addition of the neutralizing agent be enough to eliminate the oil-solubility. After the reagent has shown oil-solubility of the kind described it should be tested in water by preparing a 5% mixture. Such mixture should result in a strong milky suspension, or even a clear solution. In other words, the mixture must show ready miscibility with water, as well as with oil. The final reagent may be used after dilution with kerosene, or carbon tetrachloride, or a water-insoluble alcohol, such as amyl alcohol, or any other desired vehicle which does not destroy the oil and water-solubility of the kind previously noted. I prefer to use the reagent diluted with 25% of kerosene. Blau gas tar, particularly the material known as heavy Blau gas tar, is most desirable as a raw material. Pintsch gas tar may be used. Sometimes oleum is a more suitable sulfonating agent for the Blau gas tar. Also, at times twice as much sulfonated Blau gas tar material as naphthenic acids may be used.

From the foregoing it will be apparent that my invention is not concerned with all mixtures of two classes of materials which have been previously used for demulsification, but, on the contrary, is concerned with only a very limited class or type of mixtures that must have the characteristic or quality of both oil and water-miscibility. The superiority of the reagent or demulsifying agent contemplated by my present process is based upon its ability to treat certain emulsions more advantageously and at a somewhat lower cost than is possible with other known demulsifiers. I have not found that the demulsifying agent herein described is of universal effectiveness, and I do not believe that it will supersede the majority of the modified fatty acids, sulfated fatty acids, etc., heretofore used extensively as treating agents in the resolution of petroleum emulsions. It is believed that said demulsifying agent will find comparatively limited application, so far as the majority of oil field emulsions are concerned, but I have found that it has commercial value, as it will economically break or resolve certain oil field emulsions in a small number of cases which cannot be treated as easily and at so low a cost, with demulsifying agents heretofore available.

In practising my process, a treating agent or demulsifying agent of the kind above described may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced, introducing the treating agent into a conduit through which the emulsion is flowing; introducing the treating agent into a tank in which the emulsion is stored; or introducing the treating agent into a container that holds a sludge obtained from the bottom of an oil storage tank. In some instances it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment, the emulsion is allowed to stand in a quiescent state, usually in a settling tank, and usually at a temperature varying from atmospheric temperature to about 200° F., so as to permit the water or brine to separate from the oil, it being preferable to keep the temperature low enough to prevent the volatilization of valuable constituents of the oil. If desired, the treated emulsion may be acted upon by one or more of the various kinds of apparatus now used in the operation of breaking petroleum emulsions, such as homogenizers, hay tanks, gun barrels, filters, centrifuges, or electrical dehydrators.

The amount of treating agent that may be required to break the emulsion may vary from approximately one part of treating agent to 500 parts of emulsion, up to one part of treating agent to 20,000 or even 30,000 parts of emulsion. The proportion depends on the type of emulsion being treated, and also upon the equipment being used, and the temperature employed. In treating exceptionally refractory emulsions of the kinds known as "tank bottoms" and "residual pit oils", the ratio of 1:500, above referred to, may be required. In treating fresh emulsions, i. e., emulsions that will yield readily to the action of chemical demulsifying agents, the ratio of 1:30,000, above referred to, may be sufficient to produce highly satisfactory results. In general, we have found that for an average petroleum emulsion, a ratio of one part of treating agent to 5,000 parts of emulsion will usually be found to produce commercially satisfactory results.

Having thus described my invention, what I claim as new and desire to secure by Letters Patent is:

1. A process for breaking petroleum emulsions of the water-in-oil type, which consists in subjecting the emulsion to the action of an oil and water-soluble demulsifying agent containing not over 40% of water, dialkyl polysulfonate salts obtained by sulfonation of highly unsaturated tars, and a naphthenic acid body selected from the class comprising the acids and salts and produced from a naphthenic acid body having a molecular weight range of from 200 to 575, a mean molecular weight of approximately 225, and a distillation range of from 230° to 310° C.

2. A process for breaking petroleum emulsions of the water-in-oil type, which consists in subjecting the emulsion to the action of an oil and water-soluble demulsifying agent containing not over 40% of water, dialkyl polysulfonic salts produced from Blau gas tar, and a naphthenic acid body selected from the class comprising the acids and salts and produced from a naphthenic acid body having a molecular weight range of from 200 to 575, a mean molecular weight of approximately 225, and a distillation range of from 230° to 310° C.

3. A process for breaking petroleum emulsions of the water-in-oil type, which consists in subjecting the emulsion to the action of an oil and water-soluble demulsifying agent containing not over 40% of water, dialkyl polysulfonic salts produced from Blau gas tar by reaction with 50% of sulfuric acid at 40° C., and a naphthenic acid body selected from the class comprising acids and salts and produced from a naphthenic acid body having a molecular weight range of from 200 to 575, a mean molecular weight of approximately 225, and a distillation range of from 230° C. to 310° C.

4. A process for breaking petroleum emulsions of the water-in-oil type, which consists in subjecting the emulsion to the action of an oil and water-soluble demulsifying agent containing not over 40% of water, dialkyl polysulfonate ammonium salt produced from Blau gas tar by reaction with 50% of sulfuric acid at 40° C., and a naphthenic acid body selected from the class comprising the acids and salts and produced from a naphthenic acid body having a molecular weight range of from 200 to 575, a mean molecular weight of approximately 225, and a distillation range of from 230° to 310° C.

5. A process for breaking petroleum, emulsions of the water-in-oil type, which consists in subjecting the emulsion to the action of a demulsifying agent containing not over 40% of water, dialkyl polysulfonate salts obtained by sulfonation of highly unsaturated tars and an approximately equal amount of a naphthenic acid body selected from the class comprising the acids and salts and produced from a naphthenic acid body having a molecular weight range of from 200 to 575, a mean molecular weight of approximately 225, and a distillation range of from 230° C. to 310° C.

6. A process for breaking petroleum emulsions of the water-in-oil type, which consists in subjecting the emulsion to the action of an oil and water-soluble demulsifying agent containing not over 40% of water, dialkyl polysulfonate salts produced from Blau gas tar, and approximately an equal amount of a naphthenic acid body selected from the class comprising the acids and salts and produced from a naphthenic acid body having a molecular weight range of from 200 to 575, a mean molecular weight of approximately 225, and a distillation range of from 230° C. to 310° C.

7. A process for breaking petroleum emulsions of the water-in-oil type, which consists in subjecting the emulsion to the action of an oil and water-soluble demulsifying agent containing not over 40% of water, dialkyl polysulfonate salts produced from Blau gas tar by reaction with 50% of sulfuric acid at 40° C., and approximately an equal amount of a naphthenic acid body selected from the class comprising the acids and salts and produced from a naphthenic acid body having a molecular weight range of from 200 to 575, a mean molecular weight of approximately 225, and a distillation range of from 230° C. to 310° C.

8. A process for breaking petroleum emulsions of the water-in-oil type, which consists in subjecting the emulsion to the action of an oil and water-soluble demulsifying agent containing not over 40% of water, dialkyl polysulfonate ammonium salt produced from Blau gas tar by reaction with 50% of sulfuric acid at 40° C., and approximately an equal amount of a naphthenic acid body selected from the class comprising the acids and salts and produced from a naphthenic acid body having a molecular weight range of from 200 to 575, a mean molecular weight of approximately 225, and a distillation range of from 230° C. to 310° C.

9. A process for breaking petroleum emulsions of the water-in-oil type, which consists in subjecting the emulsion to the action of an oil and water-soluble demulsifying agent containing not over 40% of water, dialkyl polysulfonate ammonium salt produced from Blau gas tar by reaction of sulfuric acid at 40° C., and approximately an equal amount of a naphthenic acid body selected from the class comprising the acids and salts and produced from a naphthenic acid body having a molecular weight range of from 200 to 575, a mean molecular weight of approximately 225, and a distillation range of from 230° C. to 310° C., said naphthenic acid body being diluted with 25% of kerosene.

MELVIN DE GROOTE.